US011847591B2

United States Patent
Wu et al.

(10) Patent No.: US 11,847,591 B2
(45) Date of Patent: Dec. 19, 2023

(54) SHORT-TERM LOAD FORECASTING

(71) Applicant: SAMSUNG ELECTRONICS CO., LTD., Suwon-si (KR)

(72) Inventors: Di Wu, Montreal (CA); Yi Tian Xu, Montreal (CA); Xi Chen, Montreal (CA); Ju Wang, Montreal (CA); Michael Jenkin, Toronto (CA); Hang Li, Montreal (CA); Gregory Lewis Dudek, Montreal (CA); Xue Liu, Montreal (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 462 days.

(21) Appl. No.: 16/953,586

(22) Filed: Nov. 20, 2020

(65) Prior Publication Data

US 2022/0004941 A1    Jan. 6, 2022

Related U.S. Application Data

(60) Provisional application No. 63/048,298, filed on Jul. 6, 2020.

(51) Int. Cl.
*G06Q 10/04* (2023.01)
*G06N 20/20* (2019.01)
*G06Q 50/06* (2012.01)

(52) U.S. Cl.
CPC ............. *G06Q 10/04* (2013.01); *G06N 20/20* (2019.01); *G06Q 50/06* (2013.01)

(58) Field of Classification Search
CPC .................................. G06N 20/20; G06N 3/08
See application file for complete search history.

(56) References Cited

U.S. PATENT DOCUMENTS

| 10,402,733 | B1 * | 9/2019 | Li | G06N 20/20 |
| 2015/0317589 | A1 * | 11/2015 | Anderson | G06N 20/10 |
| | | | | 705/7.25 |
| 2018/0137427 | A1 * | 5/2018 | Hsieh | G06N 20/20 |
| 2018/0314975 | A1 * | 11/2018 | Zang | G06N 20/20 |
| 2020/0348628 | A1 * | 11/2020 | Hoffmann | G05B 13/048 |

(Continued)

FOREIGN PATENT DOCUMENTS

| CN | 110969293 A | * | 4/2020 | G06N 20/00 |
| KR | 1020190063198 A | | 6/2019 | |

(Continued)

OTHER PUBLICATIONS

Di Wu "Multiple Kernel Learning-Based Transfer Regression for Electric Load Forecasting", IEEE Transactions on Smart Grid, vol. 11, No. 2, Mar. 2020.*

(Continued)

*Primary Examiner* — Vincent H Tran
(74) *Attorney, Agent, or Firm* — Sughrue Mion, PLLC

(57) ABSTRACT

A method, computer program, and computer system are provided for load forecasting. Datasets corresponding to source machine learning models and a target domain base model are identified. A set of forecasting models corresponding to the identified datasets are learned. An ensemble model is determined from the learned set of forecasting models based on gradient boosting. An available resource is allocated based on the ensemble model.

20 Claims, 6 Drawing Sheets

(56) References Cited

U.S. PATENT DOCUMENTS

| | | | | |
|---|---|---|---|---|
| 2020/0372326 A1* | 11/2020 | Oreshkin | ............... | G06N 3/084 |
| 2021/0117869 A1* | 4/2021 | Plumbley | .............. | G06F 18/217 |
| 2021/0123771 A1* | 4/2021 | Vega | ...................... | G01D 4/004 |
| 2021/0248517 A1* | 8/2021 | Soppin | .................. | G06N 20/20 |
| 2022/0108171 A1* | 4/2022 | Puigcerver i Perez | .. | G06N 3/08 |
| 2022/0292533 A1* | 9/2022 | Oosugi | .............. | G06Q 30/0204 |

FOREIGN PATENT DOCUMENTS

| | | | | |
|---|---|---|---|---|
| KR | 102036243 B1 | 10/2019 | | |
| WO | WO-2018161723 A1 * | 9/2018 | ............... | G06N 3/02 |

OTHER PUBLICATIONS

Fateme Fahiman "Robust and Accurate Short-Term Load Forecasting: A Cluster Oriented Ensemble Learning Approach", IJCNN 2019. International Joint Conference on Neural Networks. Budapest, Hungary. Jul. 14-19, 2019.*

* cited by examiner

SHORT-TERM LOAD FORECASTING

CROSS-REFERENCE TO RELATED APPLICATION

This application claims priority from U.S. Provisional Patent Application No. 63/048,298, filed on Jul. 6, 2020, in the U.S. Patent and Trademark Office, which is incorporated herein by reference in its entirety.

FIELD

This disclosure relates generally to field of data processing, and more particularly to load forecasting.

BACKGROUND

Forecasting the anticipated demand for various commodities such as electricity, or data services is of significant importance on the safety, reliability and economic efficiency the underlying delivery systems such as power grids, data networks, or phone systems. By improving the load forecasting accuracy, even a small utility company, could save hundreds of thousands of dollars annually in operation costs, and many millions for larger utility companies. Therefore, accurate Short-Term Load Forecasting (STLF) is a valuable tool to facilitate efficient electric grid management and operation.

SUMMARY

Embodiments relate to a method, system, and computer readable medium for load forecasting. According to one aspect, a method for load forecasting is provided. The method may include identifying datasets corresponding to source machine learning models and a target domain base model. A set of forecasting models corresponding to the identified datasets are learned. An ensemble model is determined from the learned set of forecasting models based on gradient boosting. An available resource is allocated based on the ensemble model.

According to another aspect, a computer system for load forecasting is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying datasets corresponding to previous machine learning models. A set of forecasting models corresponding to the identified datasets are learned. An ensemble model is determined from the learned set of forecasting models based on gradient boosting. An available resource is allocated based on the ensemble model.

According to yet another aspect, a computer readable medium for load forecasting is provided. The computer readable medium may include one or more computer-readable storage devices and program instructions stored on at least one of the one or more tangible storage devices, the program instructions executable by a processor. The program instructions are executable by a processor for performing a method that may accordingly include identifying datasets corresponding to previous machine learning models. A set of forecasting models corresponding to the identified datasets are learned. An ensemble model is determined from the learned set of forecasting models based on gradient boosting. An available resource is allocated based on the ensemble model.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
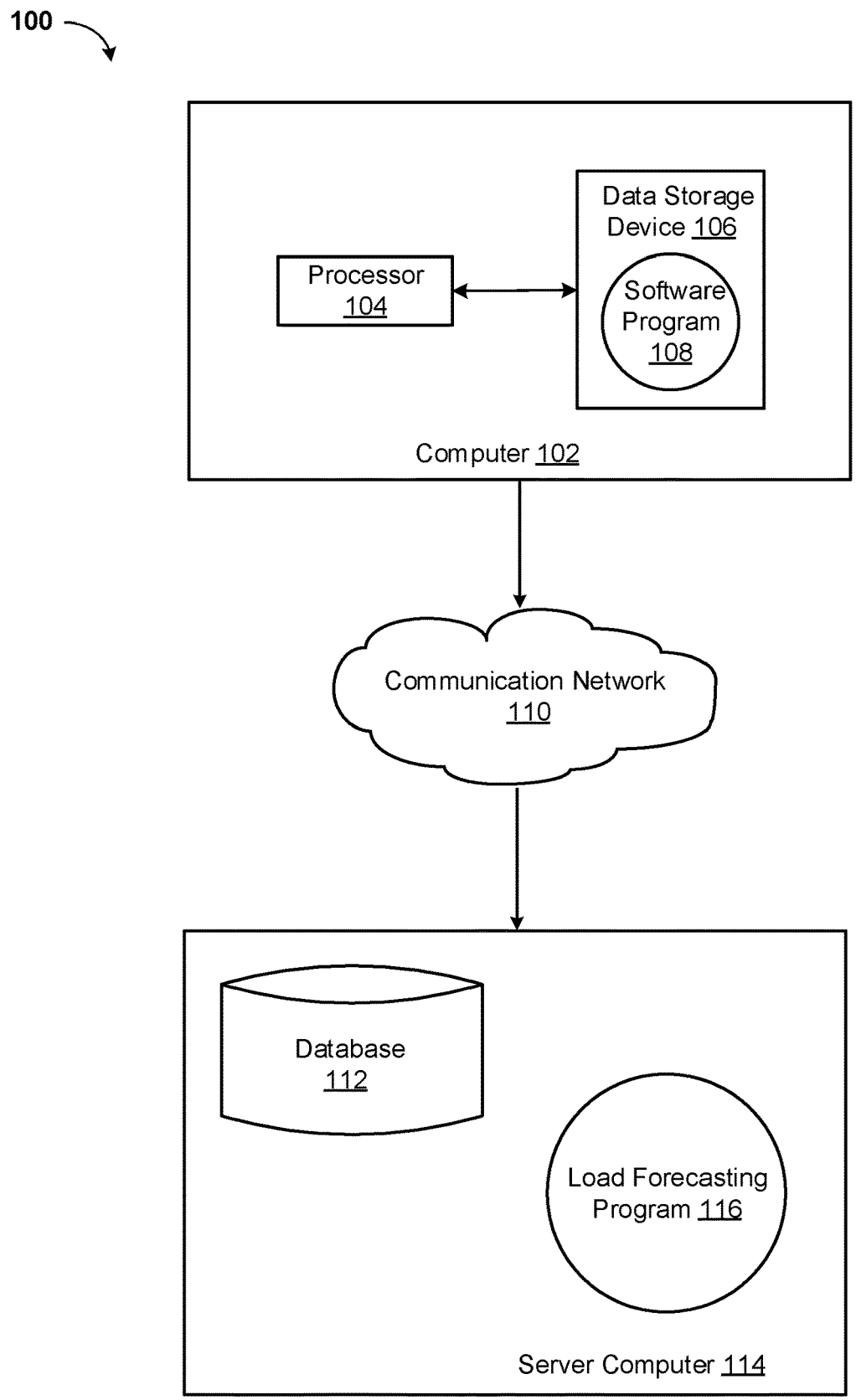
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to load forecasting. The following described exemplary embodiments provide a system, method and computer program to, among other things, re-purpose previously acquired datasets for use in training models for new tasks. Therefore, some embodiments have the capacity to improve the field of computing by allowing improved machine learning training based on re-purposing of previously collected data that may appear to be seemingly unrelated or only tangentially related to the current task.

As previously described, accurate short-term load forecasting is of significant importance for several real-world systems such as power grids, data networks, or phone systems. Since storing excess electricity is inefficient in practice, keeping the power generation systems close to the actual power demands is critical. By improving the load forecasting accuracy, even a small utility company, could save hundreds of thousands of dollars annually in operation costs, and many millions for larger utility companies. Therefore, accurate Short-Term Load Forecasting (STLF) is a valuable tool to facilitate efficient electric grid management and operation.

With the increasing penetration of electric vehicles and the growing trend in working from home, electricity consumption in the residential sector is expected to grow dramatically. Therefore, STLF is becoming more vital for the reliability and sustainability of a smart grid. However, there exists two real-world challenges in fulfilling this forecasting task. First, there may not be enough training data to learn a reliable machine model, especially for those newly built houses. Secondly, the consumption patterns for a single home tend to evolve, requiring the forecasting model to adapt rapidly with small amounts of data. Most of the recent research on electric load forecasting relies on machine learning models to capture the underlying factors that modulate the consumption pattern across time. This presupposes the availability of a large number of training samples, which can be limited or even unavailable in the electric grid domain, especially for newly built houses. Moreover, the load consumption pattern for the individual residential houses may also change. These challenges require the machine learning model to adapt fast with a small number of training samples.

It may be advantageous, therefore, to formulate the forecasting problem as a transfer regression problem. According to one or more embodiments, an E-boosting framework may use deep regression models learned from multiple sources to improve the forecasting performance for the target houses of interest when data may be scarce. One or more embodiments may use boosting transfer with multiple sources. Deep regression models on source domains may first be trained to provide relatively abundant data. These models may be transferred via the boosting framework to support other data-scarce target domains. The transfer process may be selective and customized for each target domain to minimize the potential for negative transfer.

Accurate STLF is becoming more and more stringent with the emergence of new power generation sources and power demand dynamics. For instance, renewable energy generation, including wind and solar power generation, has increased exponentially in the last ten years, bringing fundamental changes to the modern power grid. However, the output of renewable energy may be intermittent and strongly influenced by weather conditions. Furthermore, the rapid adoption of electric vehicles (EVs) induces additional complexity and uncertainty to the power system as the EV charging schedule depends strongly on the owner's behaviors. Globally, the number of EVs has surpassed 5 million in 2018, which was a 63% increase from the previous year. In addition, the recent COVID-19 pandemic may pose an unexpected impact on the grid, by introducing substantially increased electricity demands in the residential sector.

Depending on the load type, there are mainly two types of residential load forecasting: aggregated load forecasting and single home load forecasting. Aggregated load forecasting aims to forecast the aggregated load of several homes, which may be of essential importance for neighborhood-level network energy scheduling. With the widespread introduction of smart meters, high-quality data at fine-grained geographic and temporal resolution can now be collected and used for single home load forecasting, which aims to forecast the electric load for a single dwelling. This may be far more challenging than aggregated load forecasting, due to the higher variance of individual homes. With the increased interest in smart homes and the trend of working from home, single home load forecasting may be becoming more and more important.

For many real-world applications, e.g., load forecasting for newly built houses and newly deployed 5G systems, there may not be enough data to learn a reliable forecasting model. Meanwhile, there may be a large amount of data from previously deployed systems or related domains. Transfer learning represents a family of algorithms that relax the identical distribution assumption of traditional machine learning paradigms. It aims to reuse the knowledge learned from the source domain to boost the learning performance in the target domain.

Depending on the transferred knowledge, transfer learning can be categorized as instance transfer, parameter transfer, and relational-knowledge-transfer. Existing deep regression models on the source domains (source houses) may be re-used to improve the learning performance in the target domain (target house), which can be treated as parameter transfer. The performance of transfer learning depends on the correlation between the target and the source domains. If the source domain is very different from the target domain (i.e., the source domain and the target domain have a low correlation), direct knowledge transfer from the source domain to the target domain can have a negative impact, called negative transfer.

Neural networks have been applied for different types of applications and have become promising candidate models for load forecasting. Compared with feedforward neural networks (FNNs), convolutional neural networks (CNNs), and recurrent neural networks (RNNs) have shown to be more suitable for electric load forecasting because they have a stronger ability to capture the sequential nature from the data set. In one embodiment, long short-term memory (LSTM) is used as the base learner for the final ensemble model.

With the continuing trend of transportation electrification and working from home, single residential home load forecasting is becoming more and more important. The objective for single residential load forecasting is to forecast the electric load consumption for the specific home of interest, referred to as the target home. Most of the current works on load forecasting assume that there exists a large amount of data which is not realistic for some real-world scenarios. There may not be enough training data for specific homes of interest, in which makes it challenging to learn a reliable machine learning model, especially when a deep learning model is used. Meanwhile, there may be a large amount of data from other houses, and can use deep learning models to learn powerful load forecasting models. One embodiment describes a boosting based deep transfer learning algorithm, Multiple-source Boosting based Deep Transfer Regression (MBDTR), to utilize the deep learning models learned from multiple source domains.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Referring now to FIG. 1, a functional block diagram of a networked computer environment illustrating a load forecasting system 100 (hereinafter "system") for short-term load-forecasting. It should be appreciated that FIG. 1 provides only an illustration of one implementation and does not imply any limitations with regard to the environments in which different embodiments may be implemented. Many modifications to the depicted environments may be made based on design and implementation requirements. For example, the load forecasting system described herein may be used for electric load forecasting (e.g., predicting an amount of energy consumption used by residential power customers), smart traffic (e.g., predicting traffic volumes on roads for more efficient route planning), and deployment of 5G/6G wireless networks (e.g., predicting network load and available bandwidth).

According to one or more embodiments, the ensemble model may be used for residential electric load forecasting by either utility companies or by homeowners. Smart grid technologies can help ensure an economically efficient power system with low losses, high quality, and more secure. Electric demand load forecasting may be essential for the safe and economic operation of smart grid. For example, by forecasting the electric load demand, even a small utility company could save thousands of dollars annually. Moreover, the ensemble model may be used for Internet of Things. For example, a smart home can turn on or turn off the lights automatically by predicting users actives in and out home, saving the energy cost. Additionally, by forecasting seasonal temperature changes, the smart home can turn on or off the heat and air conditioning automatically, improving living comfort.

According to one or more embodiments, the ensemble model may be used for smart traffic. Smart traffic aims to mitigate the traffic congestion in urban areas. Traffic state forecasting plays a key role in the smart traffic. For example, by predicting the path travel time, one can plan a congestion-free navigation and route. A desired traffic forecasting should be in short-term in order to modify the indications to the driver and avoid network congestion. The short-term forecasting algorithm proposed herein can be used to predict different traffic variables, including traffic flow, traffic density, average speed, and travel time. Accordingly, the ensemble model may be used for logistics & transportation. For example, by forecasting an airline traffic load, an airport can optimize the check-in progress. Additionally, one can deliver real-time bus schedule information, by predicting changes on any delays or cancellations, and promote new offerings from advertisers.

According to one or more embodiments, the ensemble model may be used for 5G and 6G networks, or other communications networks. Smart 5G/6G networks can enable automatic operations, administration, and resource management. Cell traffic load prediction is critical for smart 5G/6G networks in supporting functionalities, such as resource allocation, dynamic spectrum management, and automated network slicing. Because communication networks experience a variety of delays, including observation delays, computing delays and actuation delays. The short-term forecasting algorithm proposed herein can be used to predict different cell traffic variables, including user numbers, traffic loads, and different services (e.g., video, calls, and texts). To fully use the power of AI, accurate network states (e.g., traffic load, user number, service type) of the current and future are required. With the short-term forecasting algorithm proposed herein, future network states may be predicted accurately, enabling an advanced IT & Mobile Communication.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for short-term residential load forecasting is enabled to run a Load Forecasting Program 116 (hereinafter "program") that may interact with a database 112. The Load Forecasting Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger load forecasting program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
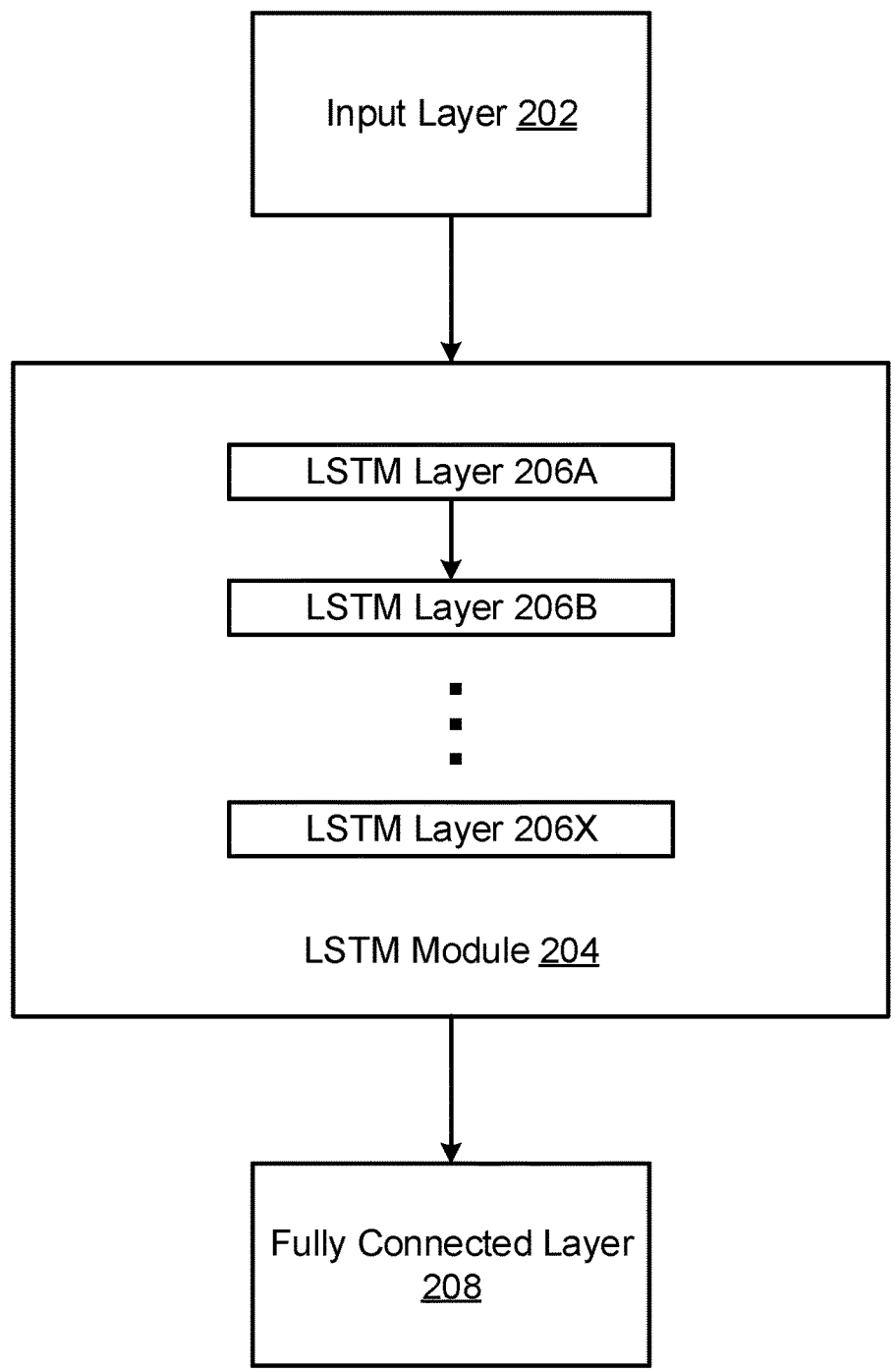
FIG. 2 is an exemplary neural network for load forecasting, according to at least one embodiment.

Referring now to FIG. 2, an exemplary load forecasting system 200 according to one or more embodiments is depicted. The load forecasting system 200 may include, among other things, an input layer 202, an LSTM module 204 containing one or many LSTM layers 206A-206X, and a fully connected layer 208. The input layer 202 may receive data from one or more sources. In the case of electric load forecasting, the input layer 202 may receive historical load consumption (e.g., the lagged load consumption data for the last three hours), historical temperature information (e.g., the lagged temperature data for the last three 166 hours), and the corresponding weekday/weekend information (e.g., a binary variable set to 1 for weekday and 0 for weekend). The input features are then fed into the LSTM layers 206A-206X of the LSTM module 204. It may be appreciated that depending on the nature of the data, the LSTM module 204 may be composed of any of a number LSTM layers 206A-206X.

Boosting is an ensemble learning algorithm that combines a set of machine learning models into a more effective one sequentially. In each boosting iteration t, one machine learning model $f^t$ is learned and added to the final ensemble model F with weight $\rho^t$ as:

$$F(x) = \sum_{t=1}^{T} \rho^t f^t(x).$$

One embodiment utilizes gradient boosting, which is a gradient-descent based formulation of the boosting framework. At each boosting iteration, by the LSTM layers 206A-206X, according to one embodiment, a new model may be learned following the direction of the negative gradient of the loss function.

$$e_s^t = \frac{1}{2} \sum_{n=1}^{N} (\gamma_s^t F_s(x_n) - r_n^t)^2.$$

One embodiment chooses the mean square error shown above as the loss function for the boosting regression problem. The model that fits the current residual (difference between the real value and the predicted value) best may be chosen at each boosting iteration. One embodiment adds the learned model multiplied by a small step size to the final ensemble model, improving the robustness of the final ensemble model. Gradient boosting with squared loss may be used to solve transfer regression problems.

The load forecasting system 200 may use deep learning models learned from source domains while tackling potential negative transfer. At the beginning of the learning process, there are S LSTM based forecasting models $F_1 \ldots F_S$, trained on the S source domains. In each boosting iteration $t \in \{1, \ldots, T\}$ performed by the LSTM models trained on source domains and a linear regression model trained on target domain will be evaluated, the base learner that fits the current residual the best is chosen and added to the final ensemble F with a small weight of $\varepsilon$. The chosen base learner can either be a LSTM model (h*) learned from one source domain or a linear model (f*) learned from the target domain as target domain base model, where h* is chosen among $F_1 \ldots F_S$ according to its performance on the target domain. $\gamma_s^t$ is the temporary weight for the s-th LSTM model in the t-th boosting iteration that re-scales the loss according to the residuals. By maintaining a new model with data only from the target domain and transferring from multiple sources, the potential for negative transfer may be mitigated. The final learned regression model F is an ensemble model.

Figure 3:
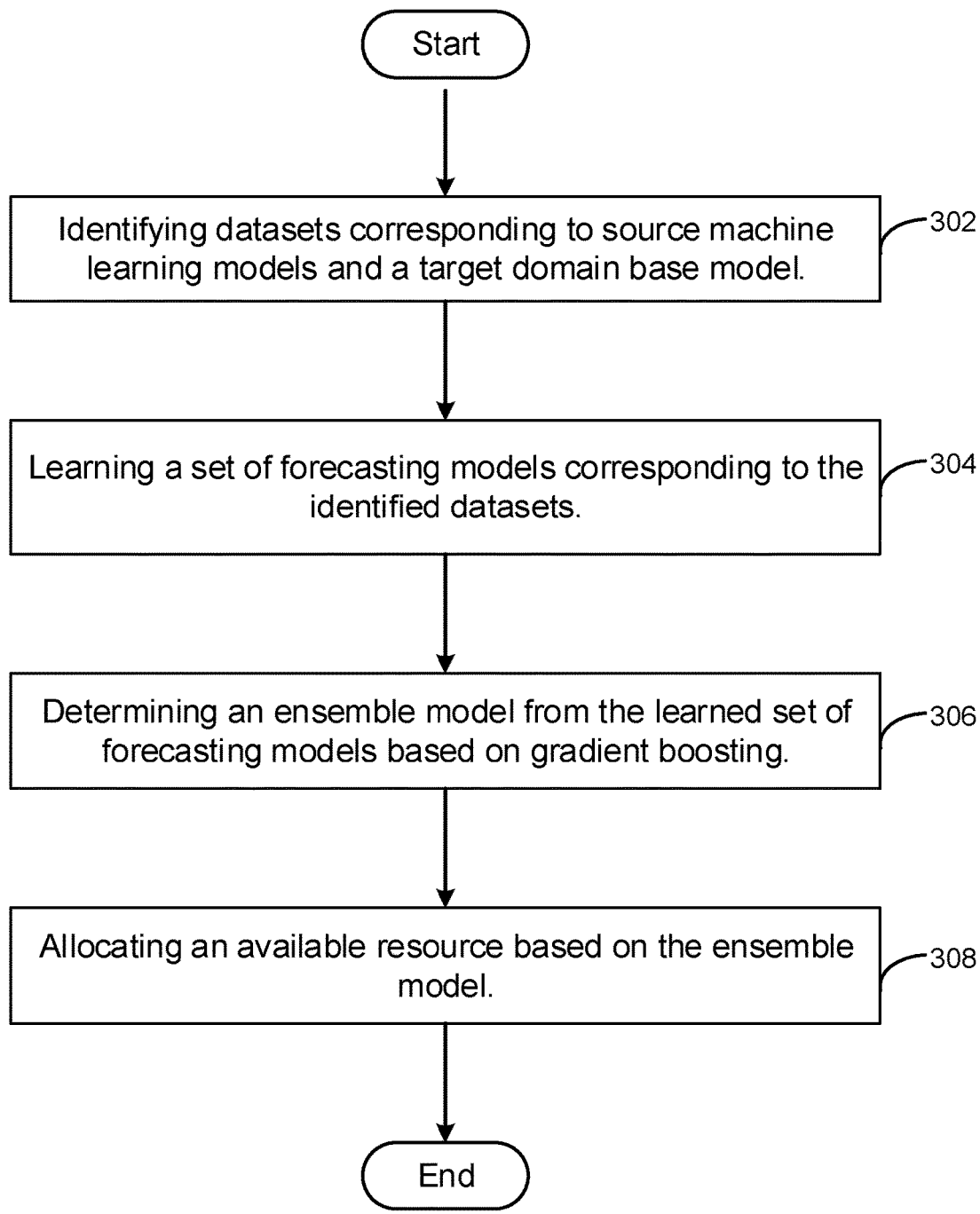
FIG. 3 is an operational flowchart illustrating the steps carried out by a program that forecasts short-term residential loads, according to at least one embodiment.

Referring now to FIG. 3, an operational flowchart illustrating the steps of a method 300 for load forecasting is depicted. In some implementations, one or more process blocks of FIG. 3 may be performed by the computer 102 (FIG. 1) and the server computer 114 (FIG. 1). In some implementations, one or more process blocks of FIG. 3 may be performed by another device or a group of devices separate from or including the computer 102 and the server computer 114.

At 302, the method 300 includes identifying datasets corresponding to source machine learning models and a target domain base model. The datasets may correspond to, for example, lagged electric load, historical temperature data, and weekday/weekend information.

At 304, the method 300 includes learning a set of new forecasting models corresponding to the identified datasets. The new models may be learned based on a direction of a negative gradient of a loss function associated with each of the identified datasets, and a model that best fits a current residual value may be selected.

At 306, the method 300 includes determining an ensemble model from the learned set of forecasting models based on gradient boosting. The gradient boosting may be an iterative process that may utilize all the learned models from the datasets in order to determine a model that best predicts a target domain.

At 308, the method 300 includes allocating an available resource based on the ensemble model. We can use the forecasting results to guide the allocate the same resource allocation, e.g., allocate the same resource that can meet the requirements of predicted results. The available resource may correspond to an electric load, a network bandwidth, and a transportation route.

It may be appreciated that FIG. 3 provides only an illustration of one implementation and does not imply any limitations with regard to how different embodiments may be implemented. Many modifications to the depicted environments may be made based on design and implementation requirements.

Figure 4:
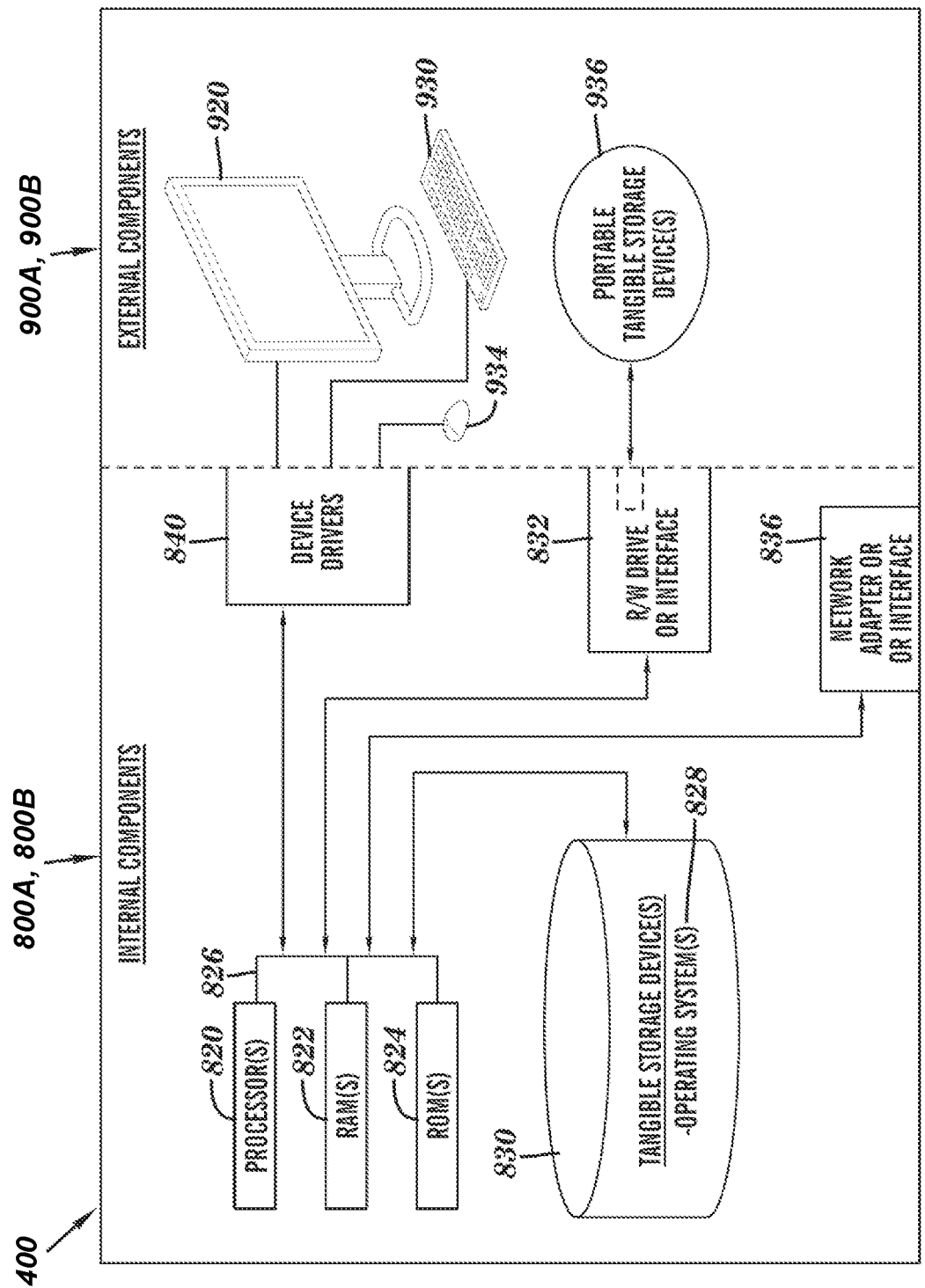
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Load Forecasting Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A, B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Load Forecasting Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Load Forecasting Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Load Forecasting Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
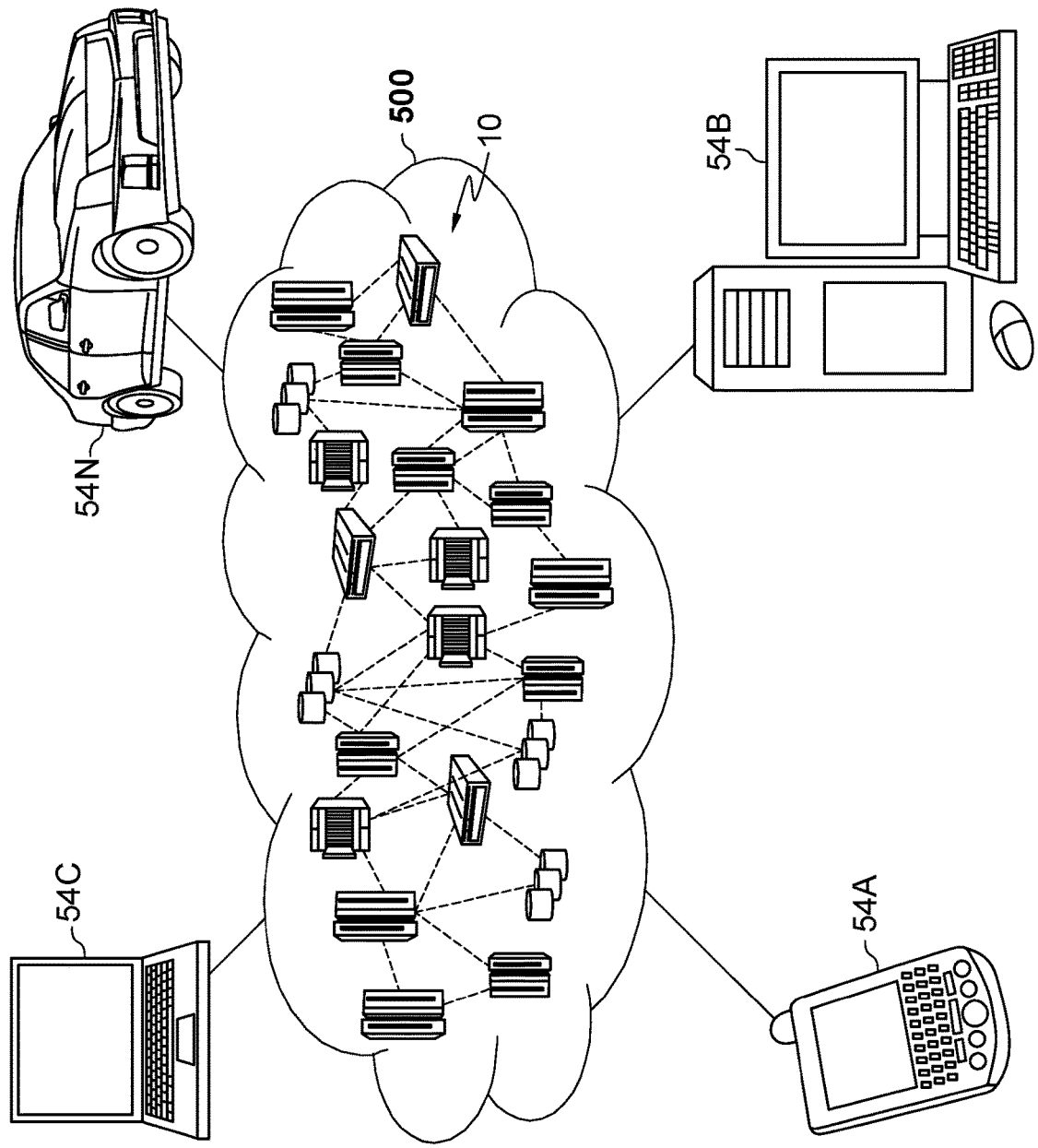
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
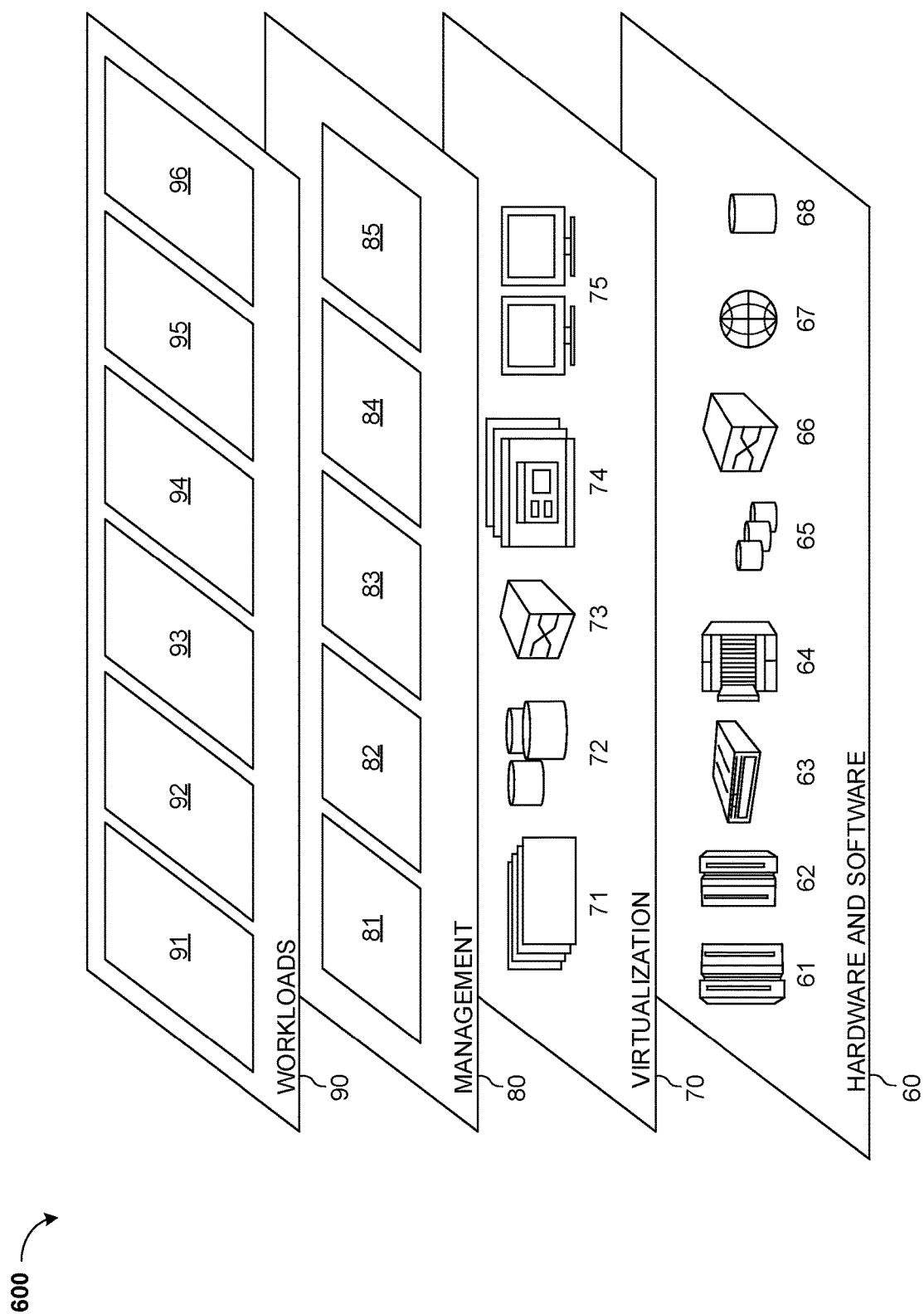
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Load Forecasting 96. Load Forecasting 96 may re-purpose previously acquired datasets associated with machine-learning tasks for new training models for which scarce data may exist.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of load forecasting, executable by a processor, comprising:
    identifying datasets corresponding to source machine learning models and a target domain base model;
    learning a set of forecasting models corresponding to the identified datasets;
    determining an ensemble model from the learned set of forecasting models based on gradient boosting; and
    allocating an available resource based on the ensemble model,
    wherein determining the ensemble model comprises:
        initializing a residual value,
        calculating, for source domains associated with the source machine learning models, a temporary weight value and a loss value;
        training a base learner based on the calculated temporary weight value and the loss value; and
        updating the residual value based on the trained base learner,
        wherein a learned model multiplied by a small step size is added to the ensemble model, and
        wherein the forecasting models are learned based on a direction of a negative gradient of a loss function associated with each of the identified datasets, and the ensemble model is identified based on the residual value.

2. The method of claim 1, wherein the available resource corresponds to an electric load.

3. The method of claim 2, wherein the datasets correspond to one or more from among a lagged electric load data, historical temperature data, and weekday and weekend data.

4. The method of claim 2, further comprising:
    forecasting a load for a single-family dwelling from among the available electric load; and
    allocating electric power corresponding to the forecast load based on the ensemble model.

5. The method of claim 1, wherein the base learner corresponds to one from among a long-short term memory model learned from the source domains and a linear model learned from a target domain associated with the target domain base model.

6. The method of claim 1, wherein the temporary weight value re-scales the loss value based on the residual value.

7. The method of claim 1, further comprising training the ensemble model based on minimizing a negative transfer, wherein the negative transfer corresponds to source domains associated with the source machine learning models and a target domain associated with the target domain base model having a low correlation factor.

8. The method of claim 1, wherein the ensemble model is determined by a neural network comprising one or more long short-term memory layers.

9. The method of claim 1, wherein the ensemble model is determined by a linear regression model trained on a target domain.

10. The method of claim 1, wherein the ensemble model is determined by a linear regression model trained on a target domain.

11. The method of claim 1, wherein the forecasting models are deep learning models learned from source domains while tackling potential negative transfer, and
    wherein at a beginning of a learning process, there are LSTM based forecasting models $F_1 \ldots F_S$, trained on the source domains and each boosting iteration $t \in \{1, \ldots, T\}$ performed by the LSTM models trained on source domains and a linear regression model trained on target domain, and
    wherein the base learner is identified based on the residual value and added to the ensemble model with a small weight of $\varepsilon$.

12. The method of claim 11, wherein the base learner is either be a LSTM model (h*) learned from one source domain or a linear model (f*) learned from the target domain as target domain base model, and
    wherein h* is chosen among $F_1 \ldots F_S$ according to its performance on the target domain.

13. A computer system for load forecasting, the computer system comprising:
    one or more computer-readable non-transitory storage media configured to store computer program code; and
    one or more computer processors configured to access said computer program code and operate as instructed by said computer program code, said computer program code including:
        identifying code configured to cause the one or more computer processors to identify datasets corresponding to source machine learning models and a target domain base model;
        learning code configured to cause the one or more computer processors to learn a set of forecasting models corresponding to the identified datasets;
        determining code configured to cause the one or more computer processors to determine an ensemble model from the learned set of forecasting models based on gradient boosting; and
        allocating code configured to cause the one or more computer processors to allocate an available resource based on the ensemble model,
    wherein determining the ensemble model comprises:
        initializing a residual value,
        calculating, for source domains associated with the source machine learning models, a temporary weight value and a loss value;
        training a base learner based on the calculated temporary weight value and the loss value; and
        updating the residual value based on the trained base learner,
        wherein a learned model multiplied by a small step size is added to the ensemble model, and
        wherein the forecasting models are learned based on a direction of a negative gradient of a loss function associated with each of the identified datasets, and the ensemble model is identified based on the residual value.

14. The computer system of claim 13, wherein the available resource corresponds to an electric load.

15. The computer system of claim 14, wherein the datasets correspond to one or more from among a lagged electric load data, historical temperature data, and weekday and weekend data.

16. The computer system of claim 14, further comprising:
forecasting a load for a single-family dwelling from among the available electric load; and
allocating electric power corresponding to the forecast load based on the ensemble model.

17. The computer system of claim 13, wherein the base learner corresponds to one from among a long-short term memory model learned from the source domains and a linear model learned from a target domain associated with the target domain base model.

18. The computer system of claim 13, further comprising training the ensemble model based on minimizing a negative transfer, wherein the negative transfer corresponds to source domains associated with the source machine learning models and a target domain associated with the target domain base model having a low correlation factor.

19. The computer system of claim 13, wherein the ensemble model is determined by a neural network comprising one or more long short-term memory layers.

20. A non-transitory computer readable medium having stored thereon a computer program for load forecasting, the computer program configured to cause one or more computer processors to:
identify datasets corresponding to source machine learning models and a target domain base model;
learn a set of forecasting models corresponding to the identified datasets;
determine an ensemble model from the learned set of forecasting models based on gradient boosting; and
allocate an available resource based on the ensemble model,
wherein the computer program is further configured to cause the one or more computer processors to determine the ensemble model by:
initializing a residual value,
calculating, for source domains associated with the source machine learning models, a temporary weight value and a loss value;
training a base learner based on the calculated temporary weight value and the loss value; and
updating the residual value based on the trained base learner,
wherein a learned model multiplied by a small step size is added to the ensemble model, and
wherein the forecasting models are learned based on a direction of a negative gradient of a loss function associated with each of the identified datasets, and the ensemble model is identified based on the residual value.

\* \* \* \* \*